May 20, 1941.　　　J. R. GRAVES　　　2,242,608
TIRE SCRAPING DEVICE
Filed Aug. 1, 1938
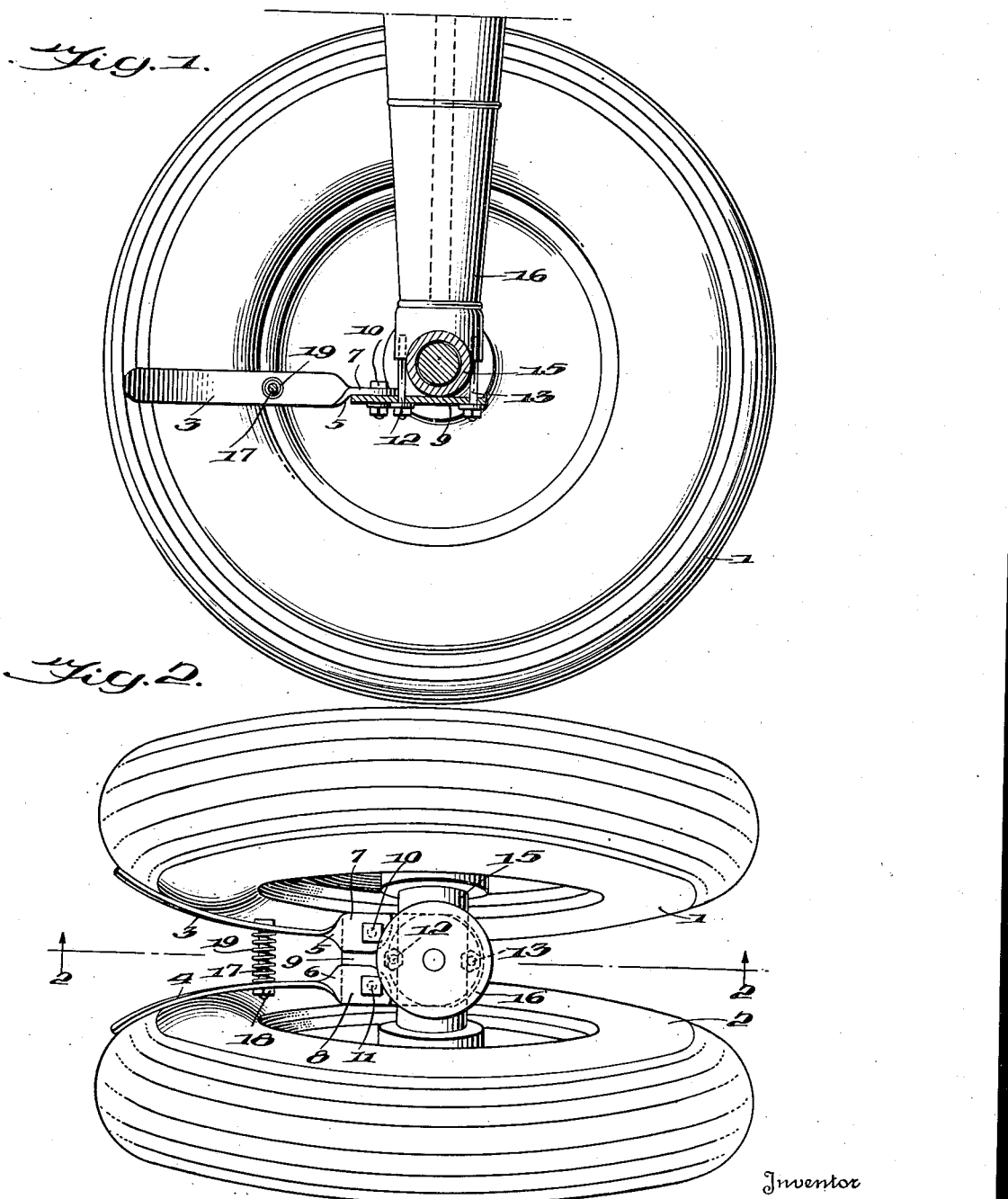
Inventor
J. R. Graves,
By Edmund N. Parry Jr.
Attorney Patented May 20, 1941

2,242,608

UNITED STATES PATENT OFFICE 2,242,608

TIRE SCRAPING DEVICE

James R. Graves, Sadorus, Ill.

Application August 1, 1938, Serial No. 222,560

1 Claim. (Cl. 280—158)

This invention relates to wheel cleaning devices and is particularly directed to a scraping device for tractors or other farm vehicles having spaced opposing dual wheels. Primarily the invention is intended for use with dual wheels having resilient tires.

An object of this invention is to provide a tire scraping device or cleaner which will prevent the accumulation of mud or dirt in the space between the tires of the dual wheels, and which may be employed with any type or make of vehicle using such wheel arrangement.

Another object of the invention is to provide a dual tire scraping device which may be adjusted between operative and inoperative positions and which need not be removed from the vehicle when not in use.

Still another object of the invention is to provide a scraper which is easily adjustable to insure simultaneous and equal cleaning of both tires of the dual wheels at all times, and which will function efficiently without wear or damage to the tires.

Still another object of the invention is to provide a tire scraping device having separate scraping members for the dual wheels which can be simultaneously brought to corresponding operative positions relative to the two tires through a common adjustment means. The members may be positioned in slightly spaced relation to the tires, or may be caused to yieldingly bear against the opposing tires with equalized pressure.

A further important feature of the invention is to provide a dual scraper arm device for dual wheels wherein movement of one scraper arm during adjustment, or during certain conditions of operation causes a corresponding movement of the other scraper arm.

A still further object is to provide a dual wheel scraper wherein a pair of separate scraper arms are pivotally mounted and interconnected for simultaneous movement, and in connection with which a common tensioning means is employed to yieldingly hold the respective arms with the same force acting on both in operative relation to the two wheels.

Another object of the invention is to provide a dual wheel scraping device which is simple and strong in design and which, except for accessory parts, may be of flat metal stock.

In the drawing:

Fig. 1 is a horizontal section taken on line 2—2 of Fig. 2; and

Fig. 2 is a top plan view of a pneumatic tired dual wheel assembly as used on tractors, showing the dual tire scraping device mounted in operative position on the supporting axle.

In the embodiment of the invention illustrated in the drawing, numerals 1 and 2 indicate the tires of the laterally spaced dual wheels mounted in the usual manner on the axle 15. Numerals 3 and 4 generally indicate the outer portion of divergently extending scraper arms, preferably of sheet metal, and suitably bent so as to properly engage the side walls of the tire. It will readily be understood in this connection that the arms may be extended in length and curved to a greater angle so that they may scrape and clean the outer peripheries of the tires as well as the side walls thereof. The scraper arms are twisted or bent, as generally shown at 5 and 6, so as to provide inner end portions 7 and 8, which portions lie in a horizontal plane. The inner ends 7 and 8 of the scraper arms are pivotally connected in spaced relation to a horizontally extending metal supporting plate 9 by means of vertical pivot bolts 10 and 11. The supporting plate is rigidly mounted under the axle 15 by any suitable means such as bolts 12 and 13 which are screwed into the axle supporting post 16. It will thus be seen that the inner ends of the scraper arms 7 and 8 are pivotally mounted in spaced relation to the base plate 9 independently of each other, so that the outer portions 3 and 4 may move independently to or from each other. As previously described, the inner end portions 7 and 8 of the scraper arms lie in a horizontal plane, and present wide bearing faces for engagement with the base plate 9, while the outer portions 3 and 4 by reason of the intermediate twist in the scraper arms lie in a vertical plane with their broad faces in engagement with the side walls of the tires 1 and 2.

An adjustable connecting means is provided between the arms independent of the supporting plate which provides for simultaneous swinging movement of the scraper arms in a common direction, movement of one arm relative to another in operation, simultaneous adjustment of the positions of the arms relative to the opposing tires, and insure equal scraping pressure of both arms against the respective tires. Such means here includes a screw bolt 17 which extends through apertures in the arms 3 and 4 beyond the supporting plate 9, and which is provided with an adjustable nut 18. The bolt 17 extends through a single coil spring 19 which spaces the arms 3 and 4, and yieldingly holds them in adjusted scraping position relative to the tires.

The nut 18 may be tightened or loosened on the bolt 17 to vary the effective tension of the spring and adjustably space the scraper arms 3 and 4. The coil spring 19 will have sufficient strength to force the scraper arms 3 and 4 outwardly against the head of the bolt 17 and the nut 18, and maintain them in position in normal operation. Thus, regardless of the variations in the distance between the side walls of the tires, the arms may be adjusted to contact the side walls thereof. As the scraper arms 3 and 4 may always move inwardly, independently of each other, any variations in the vertical plane of the side walls of either or both tires during their rotation will force either or both scraper arms inwardly against the tension of the coil spring thereby preventing wear and damage to the tires.

From the description of my invention, it will readily be seen that I have invented a tire scraper which is simple in operation and construction, which may be easily mounted on any make or type of vehicle, which is effective at all times to clean dual wheels and tires so as not to wear or damage the tires, and which may be adjusted between operative and inoperative position without weakening or injuring the same so that it need never be removed from the vehicle.

I claim:

A tire scraper adapted to clean the tires of laterally spaced dual wheels comprising a supporting member adapted to be mounted between the dual wheels, a pair of scraper arms pivotally mounted on the supporting member, said scraper arms being capable of transverse movement because of said pivotal mounting, said arms extending outwardly beyond the supporting member in spaced relation, a coiled compression spring supported by and between the arms at a point beyond the supporting member adapted to exert an equal pressure on both arms and hold them in operative relation with the respective tires, and means for adjusting the pressure of said spring.

JAMES R. GRAVES.